(12) United States Patent
Imamura et al.

(10) Patent No.: US 11,634,022 B2
(45) Date of Patent: Apr. 25, 2023

(54) POWER TRANSMISSION UNIT

(71) Applicant: TOYOTA JIDOSHA KABUSHIKI KAISHA, Toyota (JP)

(72) Inventors: Tatsuya Imamura, Okazaki (JP); Taku Harada, Nisshin (JP); Michitaka Tsuchida, Miyoshi (JP); Hiroyuki Shioiri, Yokohama (JP); Takahito Endo, Auderghem (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/867,891

(22) Filed: Jul. 19, 2022

(65) Prior Publication Data
US 2023/0054408 A1 Feb. 23, 2023

(30) Foreign Application Priority Data

Aug. 20, 2021 (JP) .............................. JP2021-134604

(51) Int. Cl.
| | |
|---|---|
| *B60K 6/40* | (2007.10) |
| *B60K 6/365* | (2007.10) |
| *F16H 57/04* | (2010.01) |
| *B60K 6/445* | (2007.10) |
| *B60K 6/547* | (2007.10) |
| *F16H 37/08* | (2006.01) |

(52) U.S. Cl.
CPC ................ *B60K 6/40* (2013.01); *B60K 6/365* (2013.01); *B60K 6/445* (2013.01); *B60K 6/547* (2013.01); *F16H 37/0806* (2013.01); *F16H 57/0436* (2013.01); *B60Y 2200/92* (2013.01)

(58) Field of Classification Search
CPC ........... F16H 37/0806; F16H 2200/201; F16H 2200/2035; F16H 2200/0094; F16H 2200/0097; F16H 57/0436; B60K 6/547; B60K 6/445; B60K 6/365; F16D 11/14; F16D 23/14
See application file for complete search history.

(56) References Cited

U.S. PATENT DOCUMENTS 8,099,219 B2 1/2012 Buur et al.
2009/0093331 A1* 4/2009 Iwanaka ................. B60K 6/365
903/910

(Continued)

FOREIGN PATENT DOCUMENTS

JP 6451524 B2 1/2019
WO 2014/147843 A1 9/2014

*Primary Examiner* — Stacey A Fluhart
(74) *Attorney, Agent, or Firm* — Oliff PLC

(57) ABSTRACT

A power transmission unit in which an oil pump is arranged without extending a shaft length. In the power transmission unit, an input shaft, a first rotary machine, a differential mechanism, and an output shaft are arranged coaxially. The power transmission unit comprise: a first clutch that engages a first movable member connected to an input element of the differential mechanism with a first engagement section formed on another rotary element; a second clutch that engages a second movable member connected to the output element of the differential mechanism with a second engagement section formed on another rotary element; a drive gear mounted on the input element; a driven gear meshed with the drive gear; and an oil pump connected to the driven gear.

8 Claims, 5 Drawing Sheets

(56) References Cited

U.S. PATENT DOCUMENTS

| | | | |
|---|---|---|---|
| 2014/0155211 A1* | 6/2014 | Kozarekar | B60L 50/16 |
| | | | 475/5 |
| 2016/0023651 A1 | 1/2016 | Ono et al. | |
| 2016/0167504 A1* | 6/2016 | Kanada | B60K 6/365 |
| | | | 475/5 |
| 2016/0368361 A1 | 12/2016 | Endo et al. | |
| 2018/0022203 A1* | 1/2018 | Banshoya | B60K 6/445 |
| | | | 180/65.235 |
| 2019/0084404 A1* | 3/2019 | Imai | B60W 10/115 |
| 2019/0184807 A1* | 6/2019 | Okamura | B60W 30/182 |
| 2019/0351894 A1* | 11/2019 | Nakagawara | F16H 3/728 |
| 2022/0196083 A1* | 6/2022 | Renner | F16D 11/10 |

* cited by examiner

POWER TRANSMISSION UNIT

CROSS-REFERENCE TO RELATED APPLICATIONS

The present disclosure claims the benefit of Japanese Patent Application No. 2021-134604 filed on Aug. 20, 2021 with the Japanese Patent Office, the disclosures of which are incorporated herein by reference in its entirety.

BACKGROUND

Field of the Disclosure

Embodiments of the present disclosure relates to the art of a power transmission unit comprising a differential mechanism in which an input shaft, a motor, and an output shaft are connected to one another in a differential manner.

Discussion of the Related Art

JP-B2-6451524 describes a drive unit for a front-engine/rear-drive layout hybrid vehicle having a power distribution device for distributing an output torque of the engine to a motor and an output member. In the drive unit described in JP-B2-6451524, the motor, the power distribution device, and two clutches for changing a torque distribution ration are arranged coaxially.

U.S. Pat. No. 8,099,219B2 describes a hybrid powertrain system comprising a longitudinally mounted engine, and differential mechanism connected to two motors. According to the teachings of U.S. Pat. No. 8,099,219B2, the differential mechanism comprises three sets of planetary gear units. In the differential mechanism, one of rotary elements is connected to the engine, another one of rotary elements is connected to the first motor, and still another one of rotary elements is connected to the second motor. In addition, a hydraulic pump is mounted on an input member transmitting an engine torque to the differential mechanism.

WO2014/147843A1 describes a hybrid vehicle driving apparatus in which an output shaft of an engine extends parallel to the width direction of the vehicle. In the driving apparatus described in WO2014/147843A1, specifically, a first rotating machine, two sets of planetary gear mechanisms, and a second rotating machine are arranged coaxially around the output shaft, and an oil pump is disposed at an end of the output shaft.

Thus, the hybrid drive units described in the foregoing prior art documents are provided with a plurality of planetary gear sets and motors. Therefore, in order to lubricate and cool the planetary gear sets ant the motors, it is preferable to arrange an oil pump in the hybrid drive units. For example, in the hybrid powertrain system described in U.S. Pat. No. 8,099,219B2, the oil pump may be arranged between an engine block and a case holding the differential mechanism. In this case, if a damper mechanism is mounted on an input shaft to damp pulsations of engine torque, the damper mechanism and the oil pump have to be situated coaxially, and consequently a shaft length of the hybrid powertrain system would be extended. Whereas, in the hybrid vehicle driving apparatus described in WO2014/147843A1, the output shaft of an engine extends in the width direction of the vehicle, and the oil pump is disposed at the end of the output shaft. Therefore, the teachings of WO2014/147843A1 may not be applied to a drive unit in which an out shaft of an engine extends in the rear direction.

SUMMARY

Aspects of the present disclosure have been conceived noting the foregoing technical problems, and it is therefore an object of the present disclosure to provide a power transmission unit in which an oil pump is arranged without extending a shaft length.

According to the exemplary embodiment of the present disclosure, there is provided a power transmission unit, comprising: an input shaft; a first rotary machine; a differential mechanism comprising a plurality of rotary elements connected to one another while being allowed to rotate in a differential manner, the plurality of rotary elements including an input element connected to the input shaft, a reaction element connected to the first rotary machine, and an output element connected to an output shaft; a first engagement device that brings a first movable member connected to the input element in a torque transmittable manner into engagement with a first engagement section formed on a first another one of the plurality of rotary elements; and a second engagement device that brings a second movable member connected to the output element in a torque transmittable manner into engagement with a second engagement section formed on the first another one or a second another one of the plurality of rotary elements. In the power transmission unit, the input shaft, the first rotary machine, the differential mechanism, and the output shaft are arranged coaxially. In order to achieve the above-explained objective, according the embodiment of the present disclosure, the power transmission unit is provided with: a drive gear that is mounted on at least any one of the input element and the output element; a driven gear that is meshed with the drive gear; and an oil pump that is connected to the driven gear in a torque transmittable manner.

In a non-limiting embodiment, the power transmission unit may further comprise: a motor; a motor drive gear that is mounted on an output shaft of the motor; and a motor driven gear that is connected to the oil pump in a torque transmittable manner while being meshed with the motor drive gear.

In a non-limiting embodiment, the power transmission unit may further comprise: a second rotary machine; and a speed reducing device that transmits a torque of the second rotary machine to an output shaft of the differential mechanism while multiplying the torque. In the power transmission unit, the input shaft, the first rotary machine, the differential mechanism, and the second rotary machine may be arranged in order around a rotational center axis of the input shaft.

In a non-limiting embodiment, the speed reducing device may include a planetary gear unit comprising: a rotary element connected to the second rotary machine; a rotary element connected to the output shaft; and a rotary element connected to a stationary member.

In a non-limiting embodiment, the first engagement device and the second engagement device may include a dog clutch.

In a non-limiting embodiment, the first engagement device and the second engagement device may be arranged on radially outer side of the differential mechanism.

In a non-limiting embodiment, the power transmission unit may further comprise a third engagement device that selectively applies a brake torque to the input shaft.

In a non-limiting embodiment, the differential mechanism may comprise a first differential mechanism and a second differential mechanism. The first differential mechanism may be adapted to perform a differential action among: a first rotary element as one of the input element, the reaction element, and the output element; a second rotary element as another one of the input element, the reaction element, and the output element; and a third rotary element. The second differential mechanism may be adapted to perform a differential action among: a fourth rotary element as the other one of the input element, the reaction element, and the output element; a fifth rotary element connected to the third rotary element; and a sixth rotary element.

In a non-limiting embodiment, the first engagement device may be adapted to selectively connect the sixth rotary element to the first rotary element or the second rotary element. On the other hand, the second engagement device may be adapted to selectively connect any two of the first rotary element, the second rotary element, and the third rotary element, or any two of the fourth rotary element, the fifth rotary element, and the sixth rotary element.

Thus, in the power transmission unit according to the exemplary embodiment of the present disclosure, the oil pump is connected to the gear mounted on any one of the input element and the output element of the differential mechanism. According to the exemplary embodiment of the present disclosure, therefore, it is possible to pump up oil by the oil pump in the amount corresponding to a power delivered to the input shaft connected to the input element of the differential mechanism, or a speed of the hybrid vehicle. For this reason, the differential mechanism may be cooled and lubricated sufficiently in any situation. In addition, the oil pump may be arranged without increasing a shaft length of the power transmission unit. Further, since the drive gear is mounted on the input element connected to the first movable member or the output element connected to the second movable member, the oil pump may be arranged without increasing the number of parts and a size of a section to transmit power to the oil pump.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
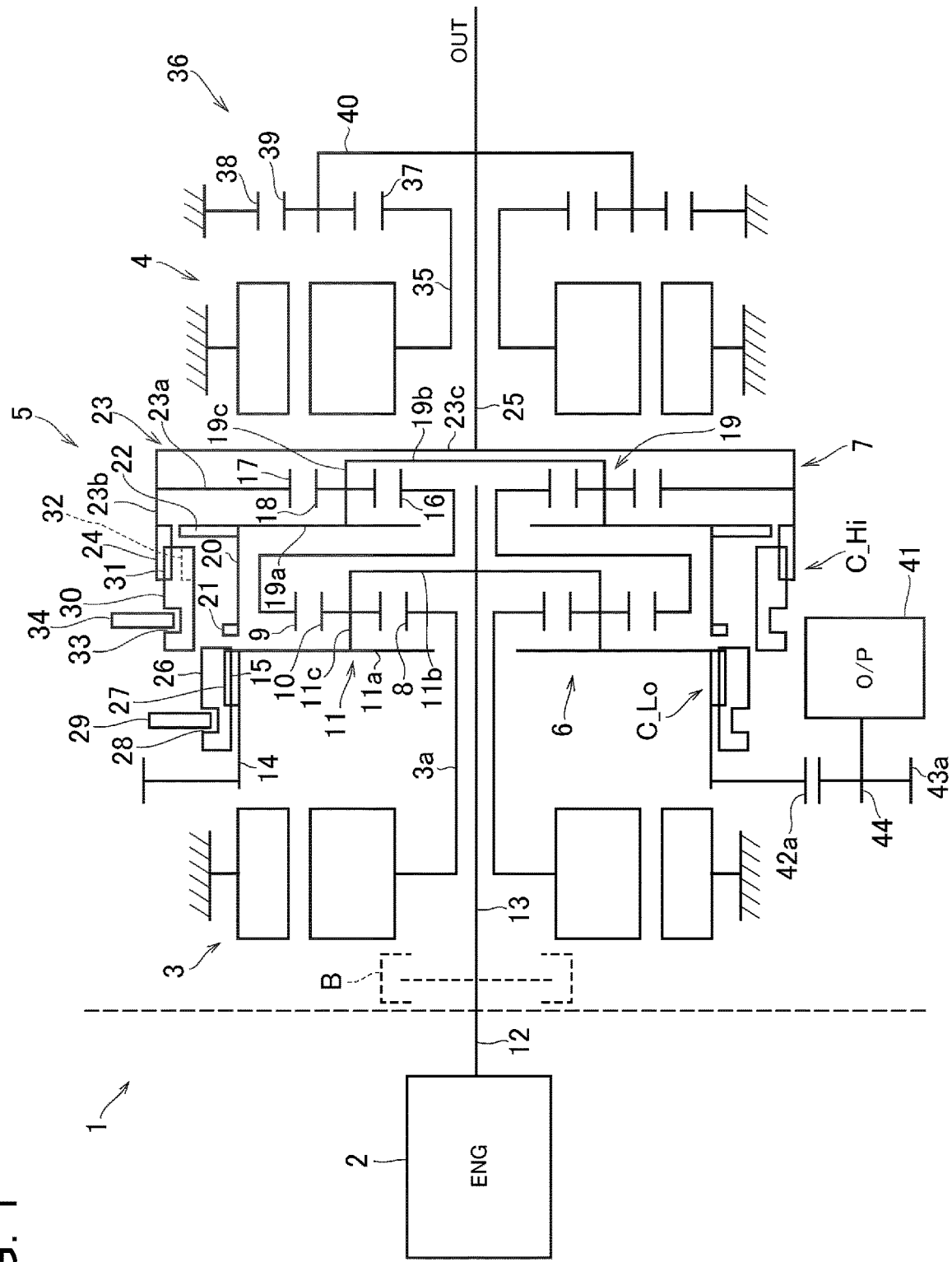
FIG. 1 is a skeleton diagram showing a first example of the power transmission unit according to the present disclosure.

Preferred embodiments of the present disclosure will now be explained with reference to the accompanying drawings. Referring now to FIG. 1, there is shown a first example of a structure of a power transmission unit 1 of a front-engine/rear-drive layout hybrid vehicle. In the hybrid vehicle shown in FIG. 1, an engine 2 is arranged in a front section of the hybrid vehicle, and an output power of the engine 2 is distributed to a pair of rear wheels (not shown) through the power transmission unit 1. In FIG. 1, the dashed line indicates an opening end of a casing of the power transmission unit 1, and the opening end of the casing is brought into contact with an engine block.

Specifically, the hybrid vehicle shown in FIG. 1 is a dual-motor hybrid vehicle in which a prime mover includes the engine 2, a first motor 3 as a first rotary machine, and a second motor 4 as a second rotary machine. According to the exemplary embodiment of the present disclosure, a motor-generator having a generating function is adopted as the first motor 3. In the power transmission unit 1, a speed of the engine 2 is controlled by the first motor 3, and the second motor 4 is driven by an electric power generated by the first motor 3 to generate a driving torque for propelling the hybrid vehicle. The motor-generator having a generating function may also be employed as the second motor 4.

A power split mechanism 5 as a differential mechanism is connected to the engine 2. The power split mechanism 5 includes a power split section 6 that distributes the output torque of the engine 2 to the first motor 3 side and to an output side, and a transmission section 7 that alters a torque split ratio. Specifically, the power split section 6 and the transmission section 7 are arranged in order from the engine 2 around a rotational center axis of the engine 2.

For example, a single-pinion planetary gear unit adapted to perform differential action among three rotary elements may be employed as the power split section 6. Specifically, the power split section 6 as a first differential mechanism comprises: a sun gear 8 as second rotary element; a ring gear 9 as a third rotary element which is an internal gear arranged concentrically with the sun gear 8; a plurality of pinion gears 10 interposed between the sun gear 8 and the ring gear 9 while meshing with both gears 8 and 9; and a carrier 11 as a first rotary element supporting the pinion gears 10 in a rotatable manner. In the power split section 6, accordingly, the sun gear 8 serves mainly as a reaction element, the ring gear 9 serves mainly as an output element, and the carrier 11 serves mainly as an input element.

An output shaft 12 of the engine 2 is connected to an input shaft 13 of the power split mechanism 5 connected to the carrier 11 so that an output power of the engine 2 is applied to the carrier 11. As an option, an additional gear unit may be interposed between the input shaft 13 and the carrier 11, and a damper device and a torque converter may be interposed between the output shaft 12 and the input shaft 13. In this case, the damper device and the torque converter may be arranged in an available space of the opening side of the casing.

The sun gear 8 is connected to a rotor shaft 3a of the first motor 3. In the first example shown in FIG. 1, the power split section 6 and the first motor 3 are arranged coaxially around the input shaft 13 of the engine 2, and the first motor 3 is situated closer to the engine 2 than the power split section 6. Thus, the first motor 3 is disposed between the engine 2 and the power split section 6.

The carrier 11 comprises a pair of carrier plates 11a and 11b being opposed to each other, and a plurality of pinion shafts 11c each of which extends between the carrier plates 11a and 11b while penetrating through the pinion gear 10. Specifically, the carrier plate 11a closer to the first motor 3 is diametrically larger than the carrier plate 11b. A cylindrical shaft 14 extending toward the first motor 3 is joined to an outer circumference of the carrier plate 11a, and spline teeth 15 are formed on an outer circumferential surface of the cylindrical shaft 14.

The transmission section 7 as a second differential mechanism is also a single-pinion planetary gear unit comprising: a sun gear 16 as a fifth rotary element; a ring gear 17 as a fourth rotary element which is an internal gear arranged concentrically with the sun gear 16; a plurality of pinion gears 18 interposed between the sun gear 16 and the ring gear 17 while meshing with both gears 16 and 17; and a carrier 19 as a sixth rotary element supporting the pinion gears 18 in a rotatable manner. Thus, the transmission section 7 is also adapted to perform a differential action among the sun gear 16, the ring gear 17, and the carrier 19. In the transmission section 7, the sun gear 16 is connected to the ring gear 9 of the power split section 6.

The carrier 19 comprises a pair of carrier plates 19a and 19b being opposed to each other, and a plurality of pinion shafts 19c each of which extends between the carrier plates 19a and 19b while penetrating through the pinion gear 18. Specifically, the carrier plate 19a closer to the power split section 6 is diametrically larger than the carrier plate 19b and the power split section 6, and a cylindrical shaft 20 extending toward the power split section 6 is joined to an outer circumference of the carrier plate 19a.

A diameter of the cylindrical shaft 20 is identical to a diameter of the above-mentioned carrier plate 11a, and dog teeth 21 are formed on an outer circumferential surface of a leading end section of the cylindrical shaft 20. That is, the dog teeth 21 formed on the cylindrical shaft 20 is situated coaxially with the spline teeth 15 formed on the carrier plate 11a around the input shaft 13. In addition, dog teeth 22 is also formed on the cylindrical shaft 20 at an end section joined to carrier plate 19a.

Specifically, the ring gear 17 is formed on a bottomed-cylindrical member 23 opening toward the power split section 6. The bottomed-cylindrical member 23 comprises: a diametrically smaller first cylindrical section 23a on which the ring gear 17 is formed; a second cylindrical section 23b which is formed closer to the power split section 6 than the first cylindrical section 23a, and which is diametrically larger than the carrier plate 19a; and a bottom section 23c joined to an output shaft 25 extending coaxially with the input shaft 13. In addition, spline teeth 24 are formed on an inner circumferential surface of the second cylindrical section 23b. Specifically, the spline teeth 24 are formed concentrically with the dog teeth 22 around the input shaft 13, and a clearance to which a high sleeve 30 is inserted is maintained between tips (i.e., innermost portions) of the spline teeth 24 and tips (i.e., outermost portions) of the dog teeth 22.

In order to use the power split section 6 and the transmission section 7 as a complex planetary gear unit, a low clutch C_Lo as a first engagement device is arranged to selectively connect the carrier 19 of the transmission section 7 to the carrier 11 of the power split section 6. The low clutch C_Lo is a dog clutch comprising a cylindrical low sleeve 26 as a first movable member, and the low sleeve 26 is engaged with the above-mentioned spline teeth 15 as a first engagement section.

Specifically, spline teeth 27 are formed on an inner circumferential surface of the low sleeve 26, and are always engaged with the spline teeth 15 while being allowed to reciprocate in the axial direction with respect to the spline teeth 15 (or the carrier 11). The spline teeth 27 are also engaged with the dog teeth 21 of the cylindrical shaft 20 by moving the low sleeve 26 toward the dog teeth 21. Thus, the spline teeth 27 also serves as dog teeth.

An annular depression 28 is formed on an outer circumferential surface of the low sleeve 26, and an arcuate low shift fork 29 is fitted into the annular depression 28. Therefore, the spline teeth 27 is engaged with the dog teeth 21 and disengaged from the dog teeth 21 by reciprocating the low shift fork 29 in the axial direction by an actuator (not shown). Thus, the low shift fork 29 and the low sleeve 26 serve as the low clutch C_Lo to selectively connect the carrier 19 to the carrier 11.

By thus connecting the carrier 19 to the carrier 11, the power split section 6 and the transmission section 7 are allowed to serve as a complex planetary gear unit in which the carriers 11 and 19 serve as an input element, the sun gear 8 of the power split section 6 serves as a reaction element, and the ring gear 17 of the transmission section 7 serves as an output element.

In order to rotate the rotary elements of the transmission section 7 integrally, a high clutch C_Hi as a second engagement device is arranged to selectively connect the ring gear 17 to the carrier 19 in the transmission section 7. The high clutch C_Hi is also a dog clutch comprising a cylindrical high sleeve 30 as a second movable member, and the high sleeve 30 is engaged with the above-mentioned dog teeth 22 as a second engagement section.

Specifically, spline teeth 31 are formed on an outer circumferential surface of the high sleeve 30, and are always engaged with the spline teeth 24 while being allowed to reciprocate in the axial direction with respect to the spline teeth 24 (or the carrier 17). In addition, dog teeth 32 are formed on an inner circumferential surface of the high sleeve 30, and are engaged with the dog teeth 22 by moving the high sleeve 30 toward the ring gear 17.

An annular depression 33 is formed on an outer circumferential surface of the high sleeve 30, and an arcuate high shift fork 34 is fitted into the annular depression 33. Therefore, the dog teeth 32 is engaged with the dog teeth 22 and disengaged from the dog teeth 22 by reciprocating the high shift fork 34 in the axial direction by an actuator (not shown). Thus, the high shift fork 34 and the high sleeve 30 serve as the high clutch C_Hi to selectively connect the ring gear 17 to the carrier 19.

By thus connecting the ring gear 17 to the carrier 19, the power split section 6 and the transmission section 7 are allowed to serve as a complex planetary gear unit in which the carrier 11 of the power split section 6 serves as an input element, the sun gear 8 of the power split section 6 serves as a reaction element, and the ring gear 17 and the carrier 19 of the transmission section 7 serve as an output element.

The second motor 4 is fitted onto the output shaft 25 while being allowed to rotate relatively to the output shaft 25. A through hole is formed in a rotor of the second motor 4, and the output shaft 25 is inserted into the through hole of the rotor of the second motor 4.

Specifically, a hollow rotor shaft 35 of the second motor 4 extends toward the rear section of the hybrid vehicle, and the output shaft 25 is inserted into the rotor shaft 35 to be connected to the rotor shaft 35 through a speed reducing device 36. According to the first example shown in FIG. 1, a single-pinion planetary gear unit is adopted as the speed reducing device 36. Specifically, the speed reducing device 36 comprises: a sun gear 37 formed on a leading end of the rotor shaft 35; a ring gear 38 arranged concentrically with the sun gear 37 while being fixed to a stationary member such as the casing; a plurality of pinion gears 39 interposed between the sun gear 37 and the ring gear 38 while meshing with both gears 37 and 38; and a carrier 40 supporting the pinion gears 39 in a rotatable manner. The carrier 40 is connected to the output shaft 25.

The output shaft 25 further extends to be connected to the rear wheels through a propeller shaft, a differential gear unit, and driveshafts (neither of which are shown).

In order to deliver an output power of the first motor 3 to the output shaft 25 through the power split mechanism 5 by applying a brake torque to the input shaft 13, a brake device B or a one-way clutch as a third engagement device depicted by the dashed line in FIG. 1 may be arranged in the power transmission unit 1.

In the vehicle shown in FIG. 1, an operating mode may be selected from a hybrid mode (to be abbreviated as "HV mode" hereinafter) in which the vehicle is propelled by a drive torque generated by the engine 2, and an electric vehicle mode (to be abbreviated as "EV mode" hereinafter) in which the vehicle is propelled by a drive torque generated by the second motor 4 without using the engine 2. The HV mode may be selected from a hybrid-low mode (to be abbreviated as "HV-Low mode" hereinafter), a hybrid-high mode (to be abbreviated as "HV-High mode" hereinafter), and a fixed mode. Specifically, in the HV-Low mode, a ratio of the output torque of the engine 2 mechanically delivered to the output shaft 25 through the power split mechanism 5 (i.e., a split ratio) is relatively large. By contrast, in the HV-High mode, the ratio of the output torque of the engine 2 mechanically delivered to the output shaft 25 through the power split mechanism 5 is relatively small. In the fixed mode, the output torque of the engine 2 is delivered to the output shaft 25 without being changed.

For example, a torque Te generated by the engine 2 and delivered to the output shaft 25 in the HV-Low mode may be expressed as "$(1/(1-\rho 1 \cdot \rho 2))$Te". Whereas, the torque Te generated by the engine 2 and delivered to the output shaft 25 in the HV-High mode may be expressed as "$(1/(1+\rho 1))$Te". In the fixed mode, the torque Te generated by the engine 2 is delivered to the output shaft 25 without being changed. In the above expressions, "$\rho 1$" is a gear ratio between the teeth number of the ring gear 9 and the teeth number of the sun gear 8, and "$\rho 2$" is a gear ratio between the teeth number of the ring gear 17 and the teeth number of the sun gear 16. Specifically, "$\rho 1$" and "$\rho 2$" are smaller than "1". That is, in the HV-Low mode, the torque mechanically delivered to the output shaft 25 through the power split mechanism 5 is increased in comparison with that in the HV-High mode.

In the HV-Low mode and the HV-High mode as continuously variable modes, a speed of the engine 2 may be changed continuously by controlling a speed of the first motor 3. Whereas, in the fixed mode, the output shaft 25 is rotated at a same speed as the speed of the engine 2.

As described, in the EV mode, the hybrid vehicle is propelled only by the drive torque generated by the second motor 4. In the EV mode, therefore, both of the low clutch C_Lo and the high clutch C_Hi are disengaged to reduce a power loss resulting from rotating the engine 2 and the first motor 3 passively. In the case that the brake device B or one-way clutch is arranged on the input shaft 13, a torque generated by the first motor 3 may be delivered to the output shaft 25 by engaging any one of the low clutch C_Lo and the high clutch C_Hi while applying a brake torque to the input shaft 13 by the brake device B or one-way clutch.

During propulsion in the HV mode or the EV mode, heat will be generated by frictions acting between the gears of the power split mechanism 5 and the speed reducing device 36, and copper losses and iron losses of the first motor 3 and the second motor 4. Therefore, in order to cool and lubricate the power split mechanism 5 and the speed reducing device 36, it is preferable to supply oil to the gears of the power split mechanism 5 and the speed reducing device 36. Likewise, in order to cool the first motor 3 and the second motor 4, it is preferable to supply oil to the first motor 3 and the second motor 4.

To this end, a mechanical oil pump 41 is arranged in the power transmission unit 1. The oil pump 41 is adapted to discharge oil in an amount corresponding to a load on the engine 2, in other words, a power delivered to the input shaft 13 (or a speed of the input shaft 13). Specifically, a drive gear 42$a$ as an external gear is mounted on a leading end of the cylindrical shaft 14, and a driven gear 43$a$ is mounted on a rotary shaft 44 of the oil pump 41 to be meshed with the drive gear 42$a$. As illustrated in FIG. 1, the position of the driven gear 43$a$ is offset from that of the low shift fork 29 in the axial direction of the cylindrical shaft 14, and the oil pump 41 is disposed on a radially outer side of the low sleeve 26.

Thus, according to the first example, the oil pump 41 is connected to the carrier 11 as the input element of the power split mechanism 5 in a torque transmittable manner through the drive gear 42$a$ and the driven gear 43$a$. Therefore, it is possible to pump up the oil by the oil pump 41 in the amount corresponding to a power delivered to the input shaft 13 (or a speed of the input shaft 13), so as to cool and lubricate the power split mechanism 5 and the speed reducing device 36. In addition, since the drive gear 42$a$ is mounted on the cylindrical shaft 14 engaged with the low sleeve 26, the oil pump 41 may be arranged without increasing the number of parts and a size of a section to transmit power to the oil pump 41. Further, since the oil pump 41 is disposed on a radially outer side of the low sleeve 26, in other words, since the position of the oil pump 41 is offset from that of the low shift fork 29 in a rotational direction, the oil pump 41 may be arranged without increasing a shaft length of the power transmission unit 1.

Furthermore, a radial support stiffness of the carrier 11 is higher than that of the low sleeve 26. Therefore, relative positions of the spline teeth 15 formed on the cylindrical shaft 14 and the spline teeth 27 formed on the low sleeve 26 will not be displaced even if the drive gear 42$a$ mounted on the cylindrical shaft 14 integrated with the carrier 11 is subjected to a radial reaction force when transmitting the power to the oil pump 41. For this reason, a sliding resistance of the low sleeve 26 will not be increased.

Figure 2:
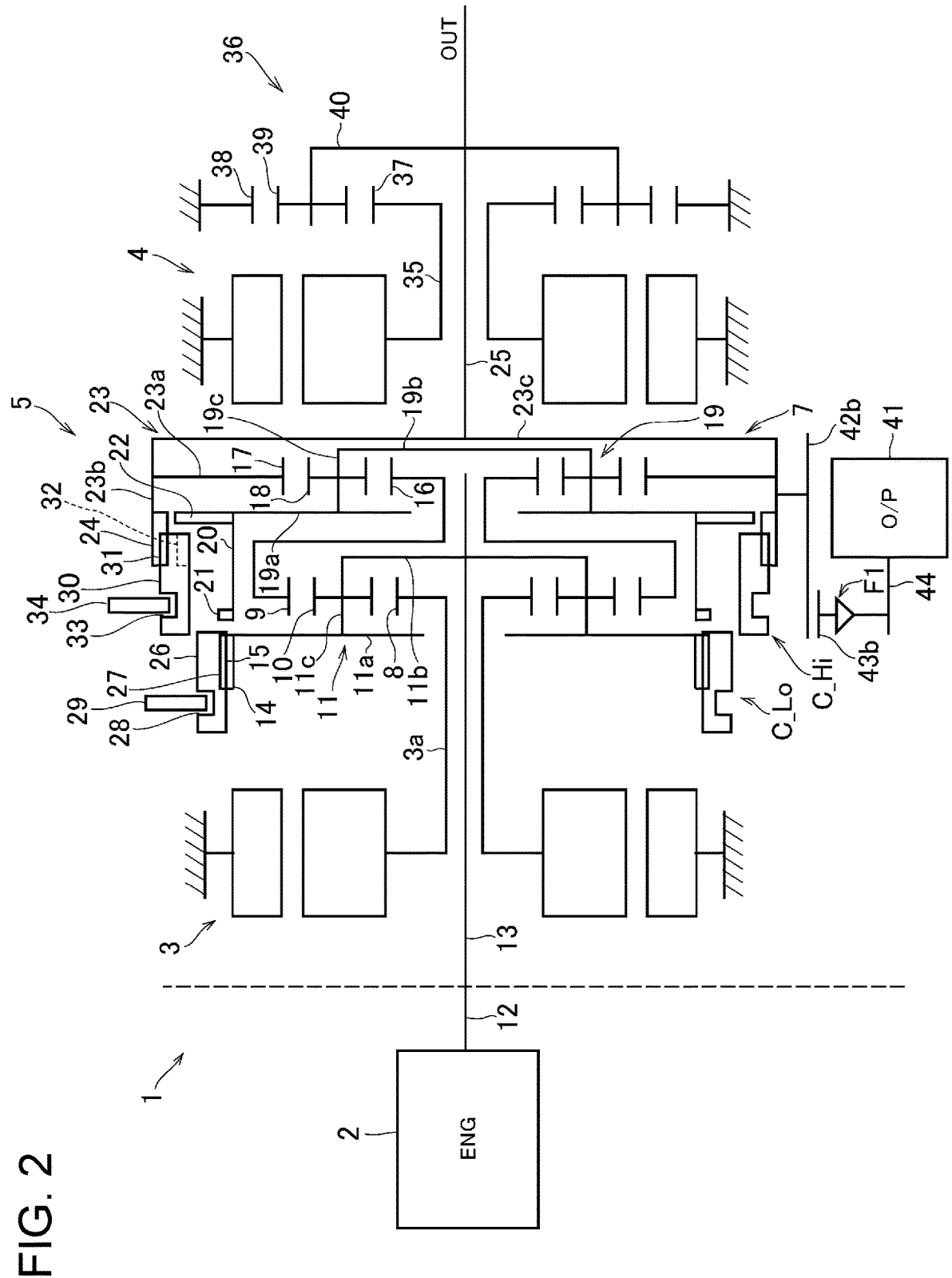
FIG. 2 is a skeleton diagram showing a second example of the power transmission unit according to the present disclosure.

Turning to FIG. 2, there is shown a second example of the power transmission unit 1. During propulsion in the EV mode, a rotation of the carrier 11 is stopped and hence the oil pump 41 is not allowed to be driven. Therefore, as illustrated in FIG. 2, the oil pump 41 may also be connected to the ring gear 17 in a torque transmittable manner so as to drive the oil pump 41 in accordance with a speed of the hybrid vehicle. The remaining structures are similar to those of the power transmission unit 1 shown in FIG. 1, and detailed explanations for the common elements will be omitted by allotting common reference numerals thereto.

In the power transmission unit 1 shown in FIG. 2, a drive gear 42$b$ is mounted on an outer circumference of the bottomed-cylindrical member 23, and a driven gear 43$b$ is meshed with the drive gear 42$b$ on a radially outer side of the high sleeve 30. According to the second example, in order to prevent an inverse rotation of the oil pump 41, a one-way clutch F1 is interposed between the driven gear 43$b$ and the rotary shaft 44 of the oil pump 41.

Specifically, the one-way clutch F1 is engaged during forward propulsion of the hybrid vehicle, and disengaged during reverse propulsion of the hybrid vehicle. In the second example, the oil pump 41 is disposed on a radially outer side of the high sleeve 30.

Thus, according to the second example, the oil pump 41 is connected to the ring gear 17 as the output element of the power split mechanism 5 in a torque transmittable manner through the drive gear 42b and the driven gear 43b. Therefore, it is possible to pump up the oil by the oil pump 41 in the amount corresponding to a speed the hybrid vehicle so as to cool and lubricate the power split mechanism 5 and the speed reducing device 36. In addition, since the drive gear 42b is mounted on the bottomed-cylindrical member 23 engaged with the high sleeve 30, the oil pump 41 may be arranged without increasing the number of parts and a size of a section to transmit power to the oil pump 41. Further, since the oil pump 41 is disposed on a radially outer side of the high sleeve 30, in other words, since the oil pump 41 overlaps with the high shift fork 34 in the axial direction, the oil pump 41 may be arranged without increasing a shaft length of the power transmission unit 1.

Furthermore, a radial support stiffness of the bottomed-cylindrical member 23 is higher than that of the high sleeve 30. Therefore, relative positions of the spline teeth 24 formed on the second cylindrical section 23b of the bottomed-cylindrical member 23 and the spline teeth 31 formed on the high sleeve 23 will not be displaced even if the drive gear 42b mounted on the bottomed-cylindrical member 23 is subjected to a radial reaction force when transmitting the power to the oil pump 41. For this reason, a sliding resistance of the high sleeve 30 will not be increased.

Figure 3:
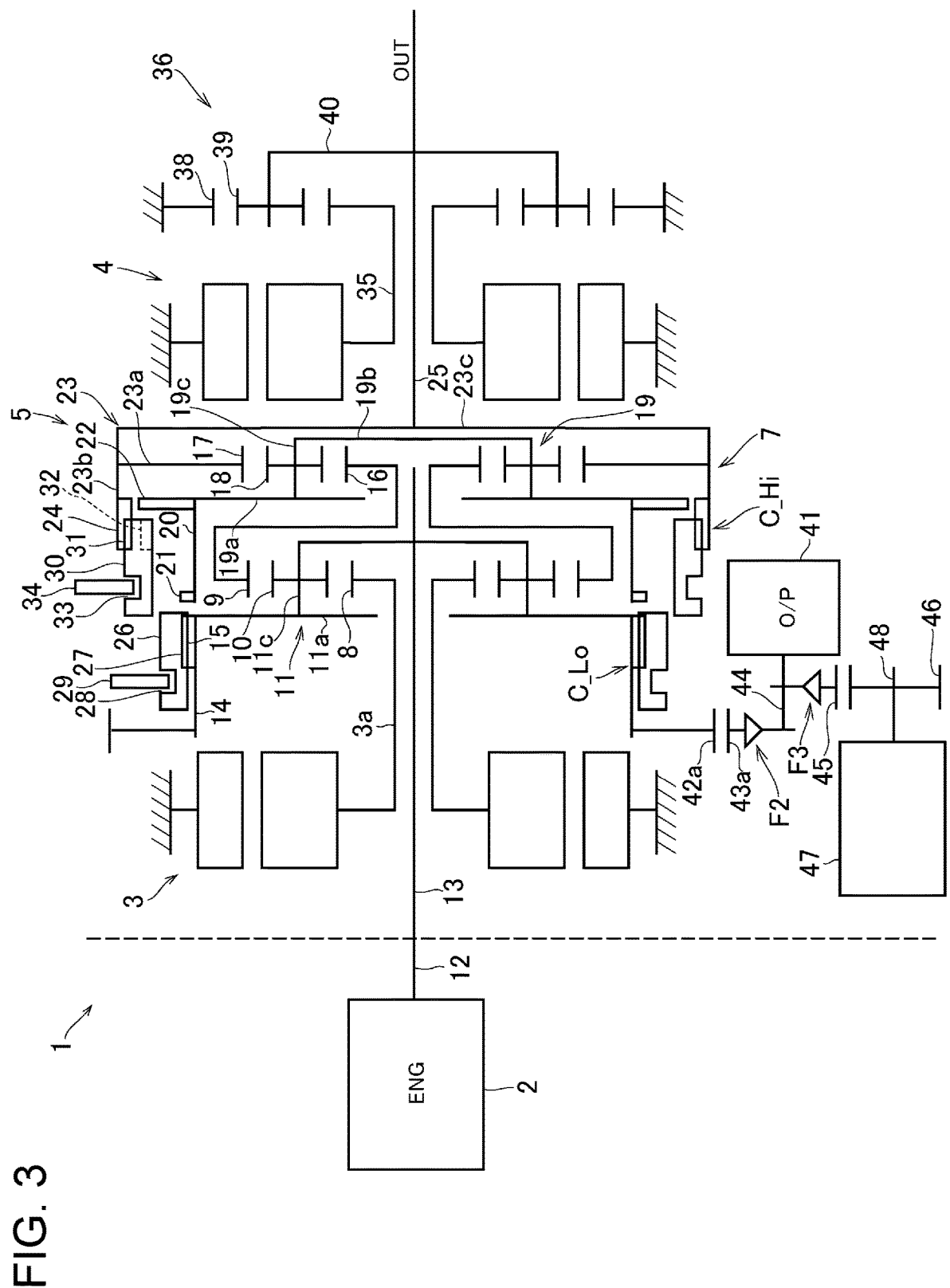
FIG. 3 is a skeleton diagram showing a third example of the power transmission unit according to the present disclosure.

Turning to FIG. 3, there is shown a third example of the power transmission unit 1. According to the third example, the power transmission unit 1 is provided with an additional motor 47 that applies power to the oil pump 41 during propulsion in the EV mode. The remaining structures are similar to those of the power transmission unit 1 shown in FIG. 1, and detailed explanations for the common elements will be omitted by allotting common reference numerals thereto. In the power transmission unit 1 shown in FIG. 3, a motor driven gear 45 is mounted on the rotary shaft 44 of the oil pump 41 in addition to the driven gear 43a, and a diameter of the motor driven gear 45 is different from a diameter of the driven gear 43a. Whereas, a motor drive gear 46 is mounted on an output shaft 48 of the motor 47 to be meshed with the motor driven gear 45. If the motor drive gear 46 may be engaged with the driven gear 43a without requiring the motor driven gear 45 having a different diameter, the motor driven gear 45 may be omitted.

In order to deliver the torque from the cylindrical shaft 14 to the oil pump 41 when the engine 2 is in operation and to prevent torque transmission from the motor 47 to the cylindrical shaft 14 when the engine 2 is not in operation, a one-way clutch F2 is interposed between the driven gear 43a and the rotary shaft 44 of the oil pump 41. Likewise, in order to reduce a drag torque derived from rotation of the motor 47 when delivering the torque from the cylindrical shaft 14 to the oil pump 41 while operating the engine 2, a one-way clutch F3 is interposed between the motor driven gear 45 and the rotary shaft 44 of the oil pump 41. That is, the one-way clutch F3 is arranged to deliver the torque to the oil pump 41 only when driving the oil pump 41 by operating the motor 47.

Thus, according to the third example, the motor 47 is connected to the oil pump 41 in a torque transmittable manner. Therefore, in addition to the advantages of the first example, the oil pump 41 may be driven by operating the motor 47 even during propulsion in the EV mode. For this reason, the power split mechanism 5 and the speed reducing device 36 may be cooled and lubricated even during propulsion in the EV mode.

Figure 4:
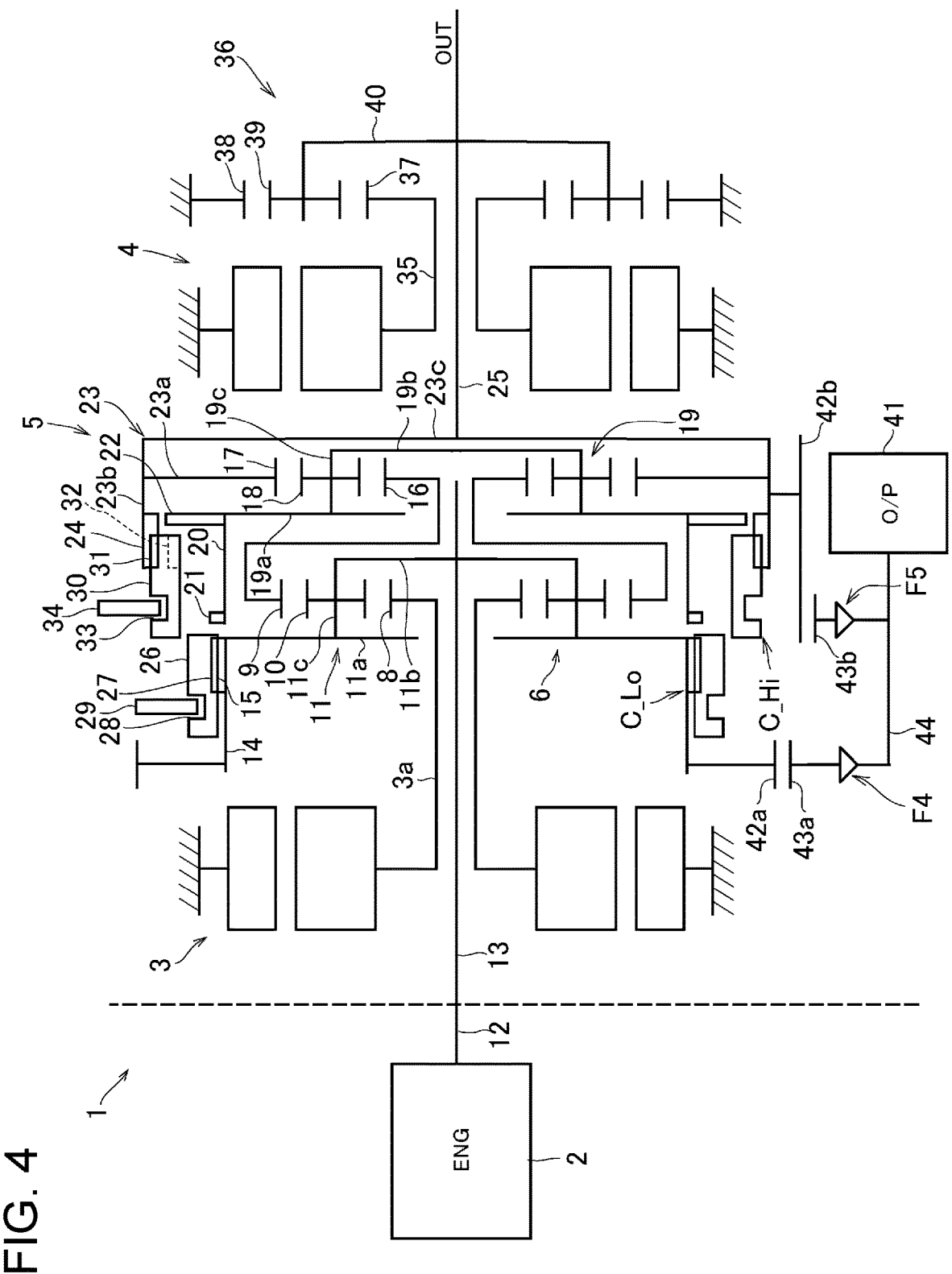
FIG. 4 is a skeleton diagram showing a fourth example of the power transmission unit according to the present disclosure.

Turning to FIG. 4, there is shown a fourth example of the power transmission unit 1. The power transmission unit 1 according to the fourth example is formed by combining the power transmission unit 1 according to the first example with the power transmission unit 1 according to the second example. The remaining structures are similar to those of the power transmission unit 1 shown in FIGS. 1 and 2, and detailed explanations for the common elements will be omitted by allotting common reference numerals thereto. In the power transmission unit 1 shown in FIG. 4, the driven gear 43a is mounted on the rotary shaft 44 of the oil pump 41 to be engaged with the drive gear 42a mounted on the cylindrical shaft 14, and the driven gear 43b is also mounted on the rotary shaft 44 of the oil pump 41 to be engaged with the drive gear 42b mounted on the bottomed-cylindrical member 23. In addition, a one-way clutch F4 is interposed between the driven gear 43a and the rotary shaft 44 of the oil pump 41, and a one-way clutch F5 is interposed between the driven gear 43b and the rotary shaft 44 of the oil pump 41. In the power transmission unit 1 shown in FIG. 4, therefore, the torque is delivered to the rotary shaft 44 from one of the cylindrical shaft 14 and the bottomed-cylindrical member 23 rotated at a higher speed.

Thus, according to the fourth example, the torque may be delivered to the oil pump 41 from the cylindrical shaft 14 and the bottomed-cylindrical member 23. According to the fourth example, therefore, not only the advantages of the first example but also the advantages of the second example may be achieved. That is, the oil pump 41 may be driven not only in the HV mode but also in the EV mode to cool and lubricate the power split mechanism 5, the speed reducing device 36, the first motor 3, and the second motor 4.

Figure 5:
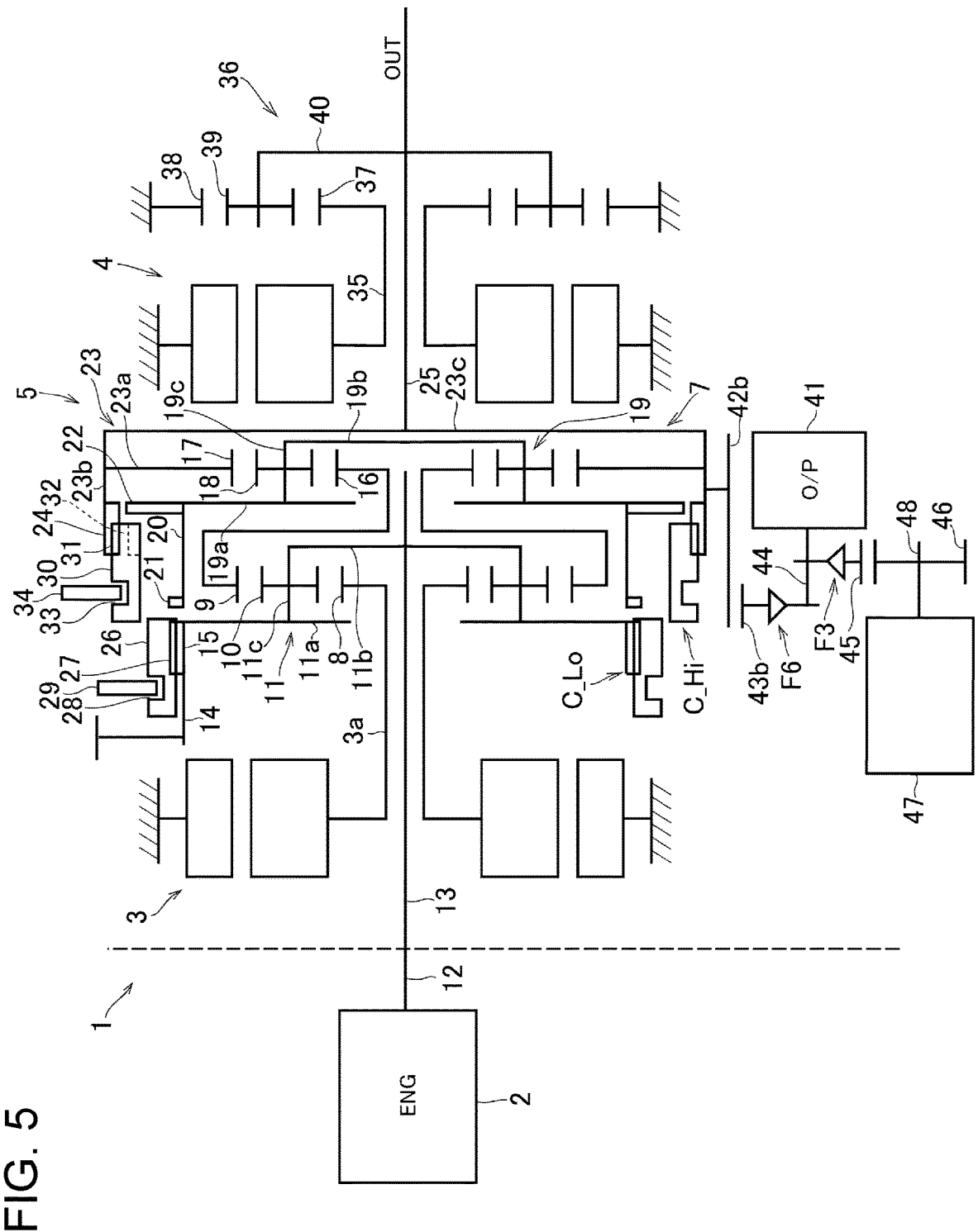
FIG. 5 is a skeleton diagram showing a fifth example of the power transmission unit according to the present disclosure.

In the power transmission unit 1 according to the second example, a discharging amount of the oil from the oil pump 41 is small when the hybrid vehicle is propelled at a low speed. According to the second example, therefore, the power split mechanism 5, the speed reducing device 36, the first motor 3, and the second motor 4 may not be cooled and lubricated sufficiently when the hybrid vehicle is propelled at a low speed while generating a large driving force. In order to allow the oil pump 41 to discharge oil sufficiently, according to a fifth example shown in FIG. 5, the oil pump 41 is driven by the above-mentioned additional motor 47. In FIG. 5, common reference numerals are allotted to the elements in common with those of the power transmission unit 1 shown in FIG. 2. In the power transmission unit 1 shown in FIG. 5, the drive gear 42b is connected to the rotary shaft 44 of the oil pump 41, and the motor driven gear 45 is mounted on the rotary shaft 44 of the oil pump 41. As described, a diameter of the motor driven gear 45 is different from a diameter of the driven gear 43a. Whereas, the motor drive gear 46 is mounted on the output shaft 48 of the motor 47 to be meshed with the motor driven gear 45. If the motor drive gear 46 may be engaged with the driven gear 43b without requiring the motor driven gear 45 having a different diameter, the motor driven gear 45 may be omitted.

In order to deliver the torque from the bottomed-cylindrical member 23 to the oil pump 41 when the hybrid vehicle is propelled at a speed higher than a predetermined speed, and to prevent torque transmission to the bottomed-cylindrical member 23 when operating the motor 47 at a low vehicle speed, a one-way clutch F6 is interposed between the driven gear 43b and the rotary shaft 44 of the oil pump 41. Likewise, in order to reduce a drag torque derived from rotation of the motor 47 when delivering the torque from the bottomed-cylindrical member 23 to the oil pump 41 when the hybrid vehicle is propelled at a speed higher than the predetermined speed, the one-way clutch F3 is interposed between the motor driven gear 45 and the rotary shaft 44 of the oil pump 41. That is, the one-way clutch F3 is arranged to deliver the torque to the oil pump 41 only when driving the oil pump 41 by operating the motor 47.

Thus, according to the fifth example, the motor 47 is connected to the oil pump 41 in a torque transmittable manner. Therefore, in addition to the advantages of the second example, an oil discharging amount of the oil from the oil pump 41 may be increased by operating the motor 47 when the hybrid vehicle is propelled at a low speed while generating a large driving force. For this reason, the power split mechanism 5, the speed reducing device 36, the first motor 3, and the second motor 4 may be cooled and lubricated sufficiently even when the hybrid vehicle is propelled at a low speed while generating a large driving force.

Although the above exemplary embodiments of the present disclosure have been described, it will be understood by those skilled in the art that the present disclosure should not be limited to the described exemplary embodiments, and various changes and modifications can be made within the scope of the present disclosure. For example, the power transmission unit according to the exemplary embodiment of the present disclosure may be applied to any kinds of hybrid vehicles comprising: a differential mechanism in which an input shaft, a first motor, and an output shaft are connected coaxially to one another in a differential manner; a first engagement device that brings a movable member connected to an input element of rotary elements of the differential mechanism into engagement with a first another one of the rotary elements; a second engagement device brings a movable member connected to an output element of the differential mechanism into engagement with the first another one or a second another one of the rotary elements; and an oil pump connected to at least any one of the input element and the output element in a torque transmittable manner.

The differential mechanism may be formed of: a first differential mechanism that performs a differential action among a first rotary element, a second rotary element, and a third rotary element; and a second differential mechanism that performs a differential action among a fourth rotary element, a fifth rotary element, and a sixth rotary element. That is, structures of the power split section 6 and the transmission section 7 should not be limited to those shown in FIGS. 1 to 5.

The first engagement device may be adapted to selectively connect the sixth rotary element to the first rotary element or the second rotary element, and the second engagement device may be adapted to selectively connect any two of the first rotary element, the second rotary element, and the third rotary element, or any two of the fourth rotary element, the fifth rotary element, and the sixth rotary element.

What is claimed is:

1. A power transmission unit, comprising:
    an input shaft;
    a first rotary machine;
    a differential mechanism comprising a plurality of rotary elements connected to one another while being allowed to rotate in a differential manner, the plurality of rotary elements including an input element connected to the input shaft, a reaction element connected to the first rotary machine, and an output element connected to an output shaft;
    a first engagement device that brings a first movable member connected to the input element in a torque transmittable manner into engagement with a first engagement section formed on a first another one of the plurality of rotary elements; and
    a second engagement device that brings a second movable member connected to the output element in a torque transmittable manner into engagement with a second engagement section formed on the first another one or a second another one of the plurality of rotary elements, wherein:
        the input shaft, the first rotary machine, the differential mechanism, and the output shaft of the differential mechanism are arranged coaxially,
        the power transmission unit further comprising:
            a drive gear that is mounted on at least any one of the input element and the output element;
            a driven gear that is meshed with the drive gear; and
            an oil pump that is connected to the driven gear in a torque transmittable manner, and
        the first engagement device and the second engagement device are arranged on radially outer side of the differential mechanism.

2. The power transmission unit as claimed in claim 1, further comprising:
    a motor;
    a motor drive gear that is mounted on an output shaft of the motor; and
    a motor driven gear that is connected to the oil pump in a torque transmittable manner while being meshed with the motor drive gear.

3. The power transmission unit as claimed in claim 1, further comprising:
    a second rotary machine; and
    a speed reducing device that transmits a torque of the second rotary machine to the output shaft of the differential mechanism while multiplying the torque,
    wherein the input shaft, the first rotary machine, the differential mechanism, and the second rotary machine are arranged in order around a rotational center axis of the input shaft.

4. The power transmission unit as claimed in claim 3, wherein the speed reducing device includes a planetary gear unit comprising:
    a rotary element connected to the second rotary machine;
    a rotary element connected to the output shaft of the differential mechanism; and
    a rotary element connected to a stationary member.

5. The power transmission unit as claimed in claim 1, wherein the first engagement device and the second engagement device include a dog clutch.

6. The power transmission unit as claimed in claim 1, further comprising:
    a third engagement device that selectively applies a brake torque to the input shaft.

7. The power transmission unit as claimed in claim 1, wherein the differential mechanism comprises:
    a first differential mechanism that performs a differential action among
        a first rotary element as one of the input element, the reaction element, and the output element,
        a second rotary element as another one of the input element, the reaction element, and the output element, and a third rotary element; and
a second differential mechanism that performs a differential action among
a fourth rotary element as the other one of the input element, the reaction element, and the output element,
a fifth rotary element connected to the third rotary element, and
a sixth rotary element.

8. The power transmission unit as claimed in claim 7, wherein the first engagement device is adapted to selectively connect the sixth rotary element to the first rotary element or the second rotary element, and
the second engagement device is adapted to selectively connect any two of the first rotary element, the second rotary element, and the third rotary element, or any two of the fourth rotary element, the fifth rotary element, and the sixth rotary element.

* * * * *